US012810592B2

(12) United States Patent
Zhou et al.

(10) Patent No.: US 12,810,592 B2
(45) Date of Patent: Nov. 24, 2026

(54) METHOD FOR INTELLIGENT SORTING, DETECTION, AND RECOGNITION OF CONSTRUCTION WASTE

(71) Applicant: Beijing University of Civil Engineering and Architecture, Beijing (CN)

(72) Inventors: Qinghui Zhou, Beijing (CN); Haoshi Liu, Beijing (CN); Diyi Zhang, Beijing (CN)

(73) Assignee: Beijing University of Civil Engineering and Architecture, Beijing (CN)

( * ) Notice: Subject to any disclaimer, the term of this patent is extended or adjusted under 35 U.S.C. 154(b) by 241 days.

(21) Appl. No.: 18/670,657

(22) Filed: May 21, 2024

(65) Prior Publication Data

US 2025/0363780 A1 Nov. 27, 2025

(51) Int. Cl.
*G06V 10/774* (2022.01)
*B07C 5/342* (2006.01)
(Continued)

(52) U.S. Cl.
CPC .......... *G06V 10/774* (2022.01); *B07C 5/3422* (2013.01); *G06V 10/776* (2022.01); *G06V 20/60* (2022.01); *B07C 2501/0054* (2013.01)

(58) Field of Classification Search
CPC .... G06V 10/774; G06V 10/776; G06V 20/60; G06V 10/764; G06V 10/82; B07C 5/3422; B07C 2501/0054
See application file for complete search history.

(56) References Cited

U.S. PATENT DOCUMENTS

2014/0241623 A1* 8/2014 Wang .................. G06F 18/2148 382/160
2017/0124409 A1* 5/2017 Choi ...................... G06V 10/25

FOREIGN PATENT DOCUMENTS

CN 110363116 A * 10/2019 ........... G06T 3/4053
CN 116630604 A * 8/2023 ............. G06V 10/25
(Continued)

OTHER PUBLICATIONS

"Pengcheng Ding et. al., A Bearing Surface Defect Detection Method based on Multi-attention Mechanism Yolov8, May 8, 2024, 2024 IOP Publishing Ltd, Measurement Science and Technology, vol. 35, No. 8" (Year: 2024).*
(Continued)

*Primary Examiner* — Chineyere Wills-Burns
*Assistant Examiner* — Phuong Hau Cai
(74) *Attorney, Agent, or Firm* — Hawaii Patent Services; Nathaniel K. Fedde; Kenton N. Fedde

(57) ABSTRACT

A method for intelligent sorting, detection, and recognition of construction waste. Construction waste images are collected as the original image sample set in the construction waste sorting site, the SRGAN algorithm is improved to preprocess the construction waste dataset images, and the preprocessed dataset is labeled and divided into train, validation, and test sets at an 8:1:1 ratio. An improved YOLOv8 detection and recognition model which introduces receptive field attention convolutions and multidimensional collaborative attention modules in the feature extraction part of the backbone is applied. This method for intelligent sorting, detection, and recognition of construction waste replaces manual labor with the construction waste intelligent sorting, detection and recognition method, solves the problem of loss of construction waste image features due to vibration of the
(Continued)

Figure 1:
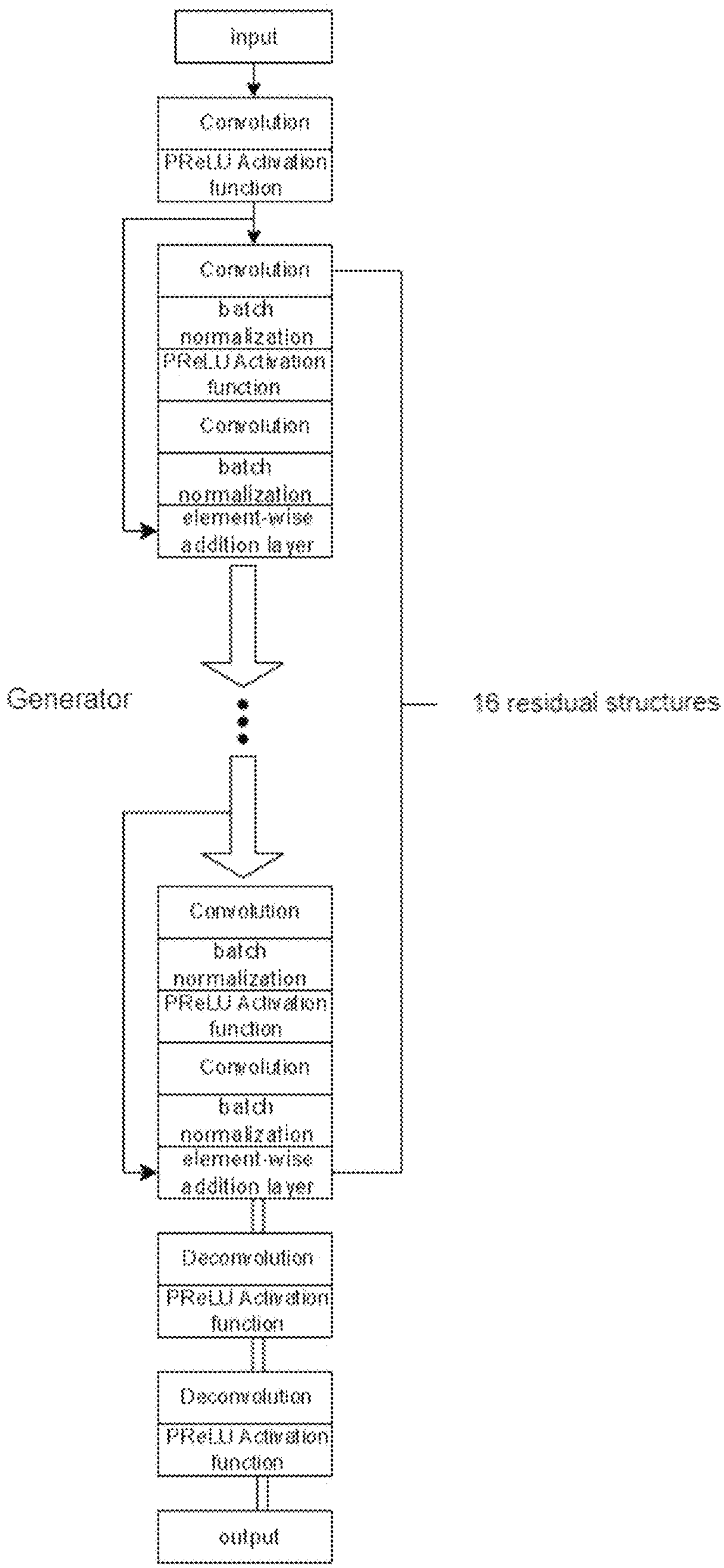

conveyor belt and mutual occlusion of construction waste during the intelligent sorting process.

10 Claims, 8 Drawing Sheets

(51) Int. Cl.

*G06V 10/776* (2022.01)
*G06V 20/60* (2022.01)

(56) References Cited

FOREIGN PATENT DOCUMENTS

| | | | | | |
|---|---|---|---|---|---|
| CN | 117765373 | A | * | 3/2024 | |
| CN | 117851794 | A | * | 4/2024 | ......... G06F 21/6245 |
| CN | 117765373 | B | * | 5/2024 | |
| CN | 118334406 | A | * | 7/2024 | ............... G06N 3/09 |
| CN | 118691789 | A | * | 9/2024 | ............. G06N 3/084 |

OTHER PUBLICATIONS

"Mariam L. Francies et. al., A Robust Multiclass 3D Object Recognition Based on Modern YOLO Deep Learning Algorithms, Jul. 2021, Concurrency and Computation Practice and Experience, Scientific and Technical Information Center, Wiley Online Library" (Year: 2021).*

* cited by examiner

METHOD FOR INTELLIGENT SORTING, DETECTION, AND RECOGNITION OF CONSTRUCTION WASTE

TECHNICAL FIELD

This invention relates to the technical field of construction waste, specifically a method for intelligent sorting, detection, and recognition of construction waste.

BACKGROUND TECHNOLOGY

With the rapid increase in global population and urbanization, the rapid growth of construction activities has generated a large amount of construction waste. Due to the lack of proper recycling schemes and effective disposal techniques, untreated construction waste is often transported to suburban landfills. However, some materials in construction have potential value and can be easily reused and recycled, including stones, plastics, red bricks, wood, etc. These sustainable materials should be classified and turned into recyclable aggregates, which can be used in new construction projects after crushing and separation, thereby reducing the need for extraction and processing of raw materials. Computer vision technology is increasingly used in the process of intelligent sorting, detection, and recognition of construction waste; However, there are many factors that affect the accuracy and efficiency of this process. Therefore, the reuse and recycling of construction waste have become an important and essential issue.

Currently, traditional methods of sorting construction waste involve mechanical operations for mixing, crushing, and screening followed by manual sorting, removal, and diversion. However, there are issues with low recycling purity and inefficient manual operations, especially in environments with high dust and noise levels that pose serious health hazards. Therefore, there is an urgent need to research a method for intelligent sorting, detection, and recognition of construction waste to replace manual labor.

In practical work environments, construction waste accumulates on conveyor belts. The vibration of the conveyor belt and the mutual occlusion of construction waste can lead to the loss of image features of construction waste. Additionally, in dusty environments, some construction waste image features may become blurred, making detection and recognition difficult.

Therefore, it is necessary to design corresponding technical solutions to address these issues.

CONTENTS OF THE INVENTION

Technical Problem to be Solved

In response to the shortcomings of existing technologies, the present invention provides a method for intelligent sorting, detection, and recognition of construction waste. This method addresses the issues of traditional construction waste sorting methods involving mechanical operations for mixing, crushing, and screening, followed by manual sorting, removal, and diversion, which result in low recycling purity and inefficient manual operations. Specifically, in environments with high dust and noise levels posing serious health hazards, where construction waste accumulates on conveyor belts, the vibration of the conveyor belt and the mutual occlusion of construction waste can lead to the loss of image features of construction waste. Additionally, in dusty environments, some construction waste image features may become blurred, making detection and recognition difficult.

Technical Solutions

To achieve the above objectives, the present invention is implemented through the following technical solutions: a method for intelligent sorting, detection, and recognition of construction waste, with the following steps:

S1. Collect construction waste images at the construction waste sorting site as the original image sample set. Improve the SRGAN algorithm, preprocess the construction waste dataset images using the improved SRGAN algorithm, create labels for the preprocessed dataset, and divide it into training, validation, and testing sets in an 8:1:1 ratio.

S2. Use the improved YOLOv8 detection and recognition model. Introduce receptive field channel attention convolution (RFCBAM) and multidimensional cooperative attention module (MCA) in the feature extraction part of the model. Design a lightweight module in the feature fusion part, consisting of lightweight convolution and bottleneck layers. Improve the YOLOv8 model to construct an improved YOLOv8 object detection model for intelligent sorting, detection, and recognition of construction waste.

In the feature fusion part, output feature P3 is up-sampled and concatenated with output feature P2 to form output feature P4. After passing through the lightweight module, output feature P4 becomes P5, which is then up-sampled and concatenated with output feature P1 to form output feature P6. Output feature P6 passes through the lightweight module and enters the small object detection layer. Simultaneously, output feature P6 is convolved and concatenated with output feature P5 to form output feature P7, which then goes through the lightweight module and enters the medium object detection layer. Similarly, output feature P7 is convolved and concatenated with output feature P3 to form output feature P8, which then enters the large object detection layer after passing through the lightweight module.

S3. Train and validate the construction waste dataset images using the improved YOLOv8 model, and apply label smoothing during training to obtain optimal weights.

After processing the dataset with the improved SRGAN algorithm, construct a construction waste image database and divide it into training, validation, and testing sets in an 8:1:1 ratio for training, validation, and testing of the improved YOLOv8 model.

Set the training epochs as 300 and the batch size as 16 during the training process.

S4. After obtaining the optimal weights, conduct testing by loading the optimal weights and testing the construction waste dataset images from the test set using the improved YOLOv8 construction waste intelligent detection model.

Preferably, the improved SRGAN algorithm mainly consists of two modules: a generator and a discriminator. The discriminator has a total of 34 layers, with the first layer being a convolutional layer, the second layer being a LeakyReLU activation layer, layers 3 to 6 consisting of convolutional layer, batch normalization layer, LeakyReLU activation layer, and EMA—efficient multi-scale attention layer, layers 7 to 28 repeating the modules of layers 3 to 6, the twenty-nineth layer being a dense connection layer, the thirtieth layer being a LeakyReLU activation layer, the thirty-first layer being a dense connection layer, and the final layer being a Sigmoid activation layer.

In addition, the efficient multi-scale attention layer utilizes a grouping structure that does not require dimension reduction. It implements cross-space learning and designs a multi-scale parallel sub-network to process image features.

Moreover, the feature extraction part of the main structure consists of 15 layers, with the first layer being the input image layer, the second layer being a convolutional layer, the third layer being a receptive field attention convolution layer, the fourth layer being a C2f module, the fifth layer being a multidimensional cooperative attention module, the sixth layer being a receptive field attention convolution layer, the seventh layer being a C2f module, the eighth layer being a multidimensional cooperative attention module, and the output feature of the eighth layer is P1. The subsequent layers follow a similar structure, with the 15th layer being a spatial pyramid pooling layer, and the output feature being P3.

Additionally, the receptive field attention convolution module comprises three branches. The first branch involves sending input features to a global average pooling layer, followed by linear and ReLU activation functions, and finally entering a linear layer with a Sigmoid activation function to output Feature1.

The second branch includes passing input features through a group convolution layer, normalization layer, and ReLU activation function, then shaping the output to Feature2.

The third branch involves processing Feature2 through average and max pooling, followed by convolution and Sigmoid activation to output Feature3.

Finally, these features are then reweighted and fed into a convolutional layer.

Furthermore, the multidimensional cooperative attention module consists of three branches. The first branch transforms input features to output C1, which is then processed through pooling, convolution, and Sigmoid activation to produce C2. The multiplication of C1 and C2 results in output C3, which is further transformed to output C4.

The second branch takes the input features to the dimension transformation layer to output C5, then passes through average pooling and standard deviation pooling layers, followed by the dimension transformation layer, convolutional layer, and another dimension transformation layer. It then applies the Sigmoid activation function to compute C6, which is multiplied by C5 to output feature C7, and finally sent to the dimension transformation layer to output feature C8.

The third branch involves input features going through average pooling and standard deviation pooling layers, followed by the dimension transformation layer, convolutional layer, and another dimension transformation layer. The Sigmoid activation function is then applied to compute C9, which is multiplied by the input features to output feature C10. Finally, the output features C4, C8, C10 are averaged for the final output.

In the improved YOLOv8 model for intelligent sorting and detection of construction waste, the main feature extraction part and the neck feature fusion part's convolution 1, convolution 2, and convolution 3 consist of ordinary convolutions (Conv2d), batch normalization layers, and SiLU activation functions.

And then, in the neck feature fusion part of the model, a lightweight module is designed, including four branches. The first branch consists of a convolution module similar to convolution 1, 2, and 3. The second branch combines a convolution module with a slice segmentation module. The third branch includes a convolution module, slice segmentation module, and lightweight bottleneck layer. The fourth branch consists of a convolution module, slice segmentation module, and two same lightweight bottleneck layers. These four branches are concatenated and processed by a convolution module for output.

Moreover, the EMA—efficient multi-scale attention module comprises three branches. The first branch divides the input features into feature groups, then sends them to the X average pooling layer to output feature A1. The second branch does the same but outputs feature A2. A3 is produced by concatenating and convolving A1 and A2, which is further processed through the branches. In the first branch, A3 is passed through a Sigmoid function to output A4.

In the second branch, the output feature A3 is passed through a Sigmoid function to produce feature A5. Subsequently, the feature group, output feature A4, and output feature A5 undergo a reweighting operation to generate feature A6. Feature A6 is then normalized within the group to output feature A7, which is further processed by average pooling and a Softmax normalization function to produce feature A8.

The third branch divides the input features into feature groups, which are then passed through a convolutional layer to obtain output feature A9. Output feature A9 is split into two paths: one path combines with output feature A8 from the first branch and enters the Matnul function to produce feature A10, while the other path goes through average pooling and a Softmax normalization function to generate feature A11. Feature A11 is then processed by the Matnul function along with output feature A7 to produce feature A12.

After combining output feature A12 with output feature A10 and passing through a Sigmoid function, the resulting feature A13 is obtained. Finally, feature A13 undergoes a reweighting operation with the feature group to serve as the final output.

For optimization of the YOLOv8 original model's loss function, the MPDIOU loss function based on the minimum point distance boundary box similarity comparison metric is preferred. The Sophia optimizer is used in place of the optimizer in the original YOLOv8 model.

Beneficial Effects

In comparison to existing technologies, the beneficial effects of the present invention are as follows: Firstly, by using the improved SRGAN algorithm to preprocess images in the construction waste dataset, the resolution of the image dataset samples is enhanced, addressing the issue of difficulty in detecting and recognizing certain features in blurry construction waste images caused by dust environments. Subsequently, the model introduces receptive field attention convolution and multidimensional collaborative attention modules in the main feature extraction part, designs lightweight modules in the feature fusion part, utilizes the effective and accurate MPDIOU bounding box regression loss function, and adopts the Sophia optimizer to enhance the YOLOv8 object detection model. This enhancement improves the feature extraction capability of the main feature extraction part, increases the fusion ability of the feature fusion part, and improves the model's loss function and optimizer, thereby increasing the model's detection accuracy, speed, and generalization ability. Finally, the construction waste dataset images are input into the improved YOLOv8 construction waste intelligent detection and recognition model for training, validation, and testing. During the training process, label smoothing is applied to obtain the optimal weights.

Then test it, load the optimal weights and input the construction waste dataset images from the test set into the improved YOLOv8 construction waste intelligent detection model for testing. This process effectively solves the loss of construction waste image features caused by conveyor belt vibrations and mutual obstruction of construction waste, as well as the difficulty in detecting and recognizing certain features in blurry construction waste images in dusty environments, achieving accurate intelligent detection and recognition of construction waste.

The technical solution proposed in this invention not only improves accuracy, but also ensures high detection speed, providing an effective method for intelligent detection and recognition of construction waste.

FIGURE DESCRIPTION

FIG. 1: Schematic diagram of the generator module composition steps of the present invention.

Figure 2:
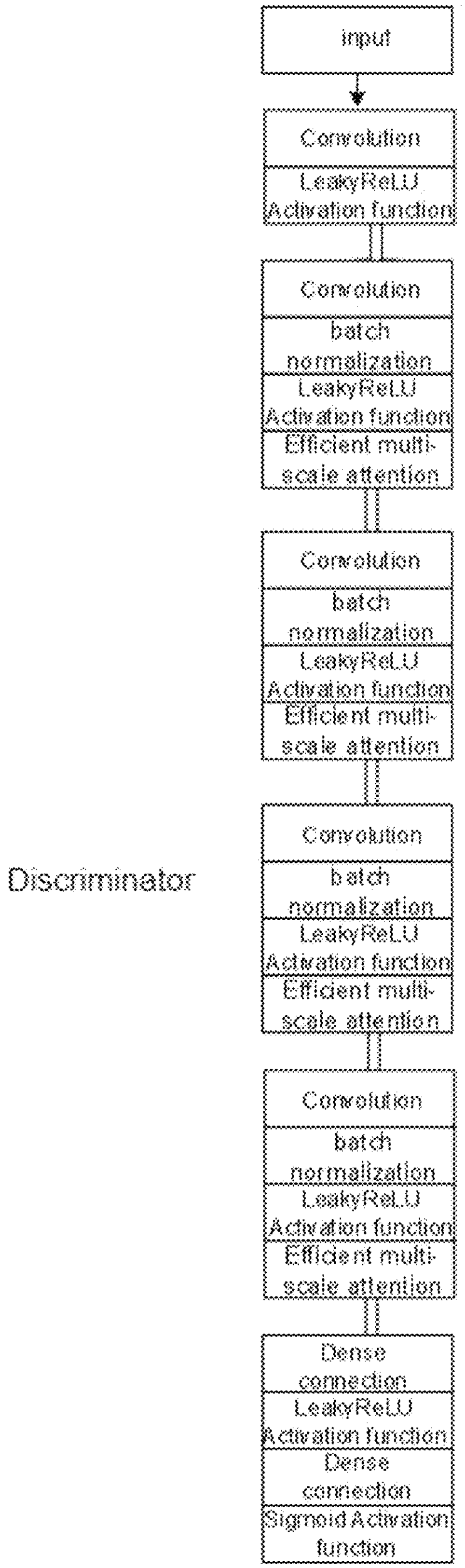

FIG. 2: Schematic diagram of the discriminator module composition steps of the present invention.

Figure 3:
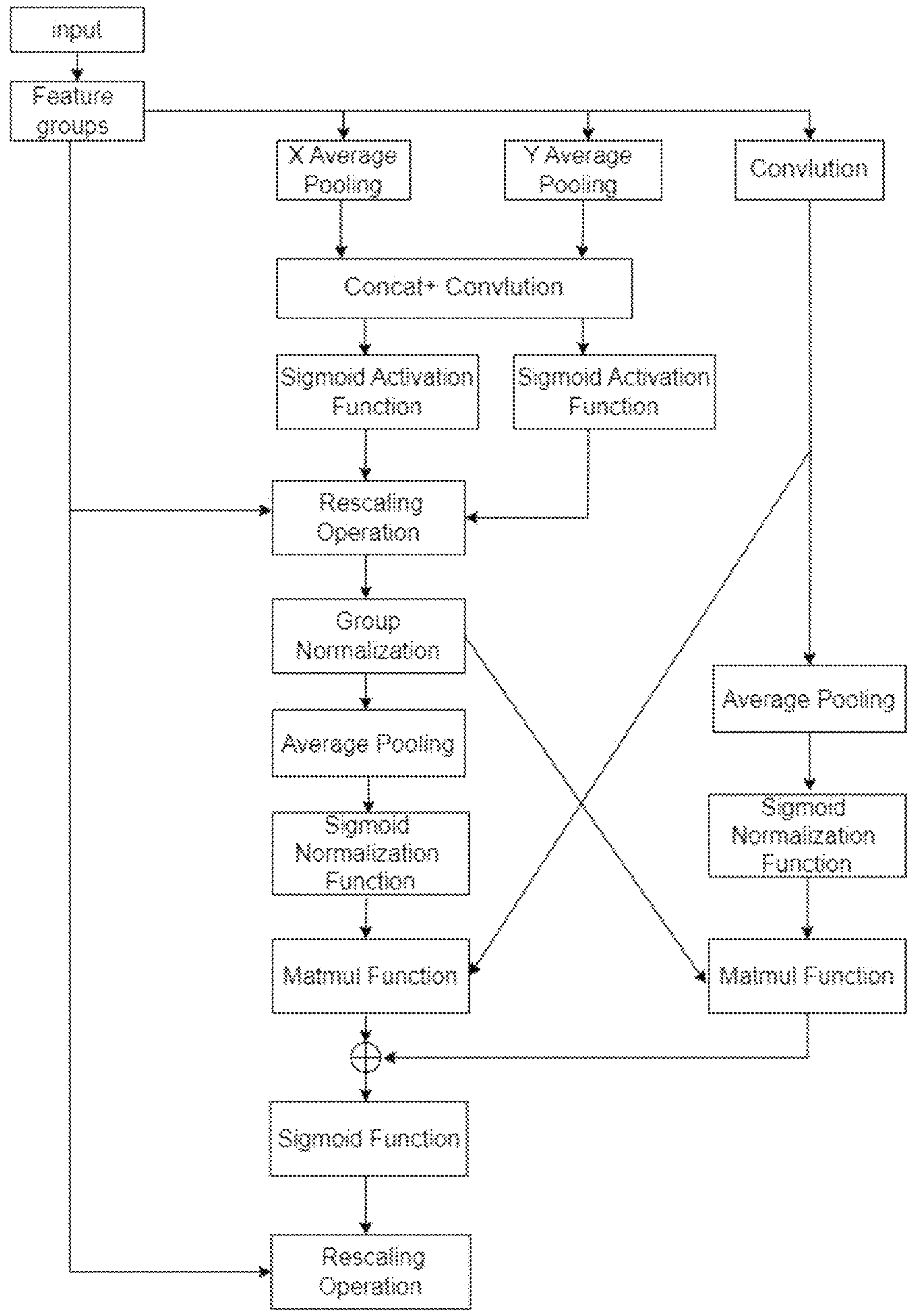

FIG. 3: Schematic diagram of the Efficient Multi-scale Attention (EMA) structure of the present invention.

Figure 4:
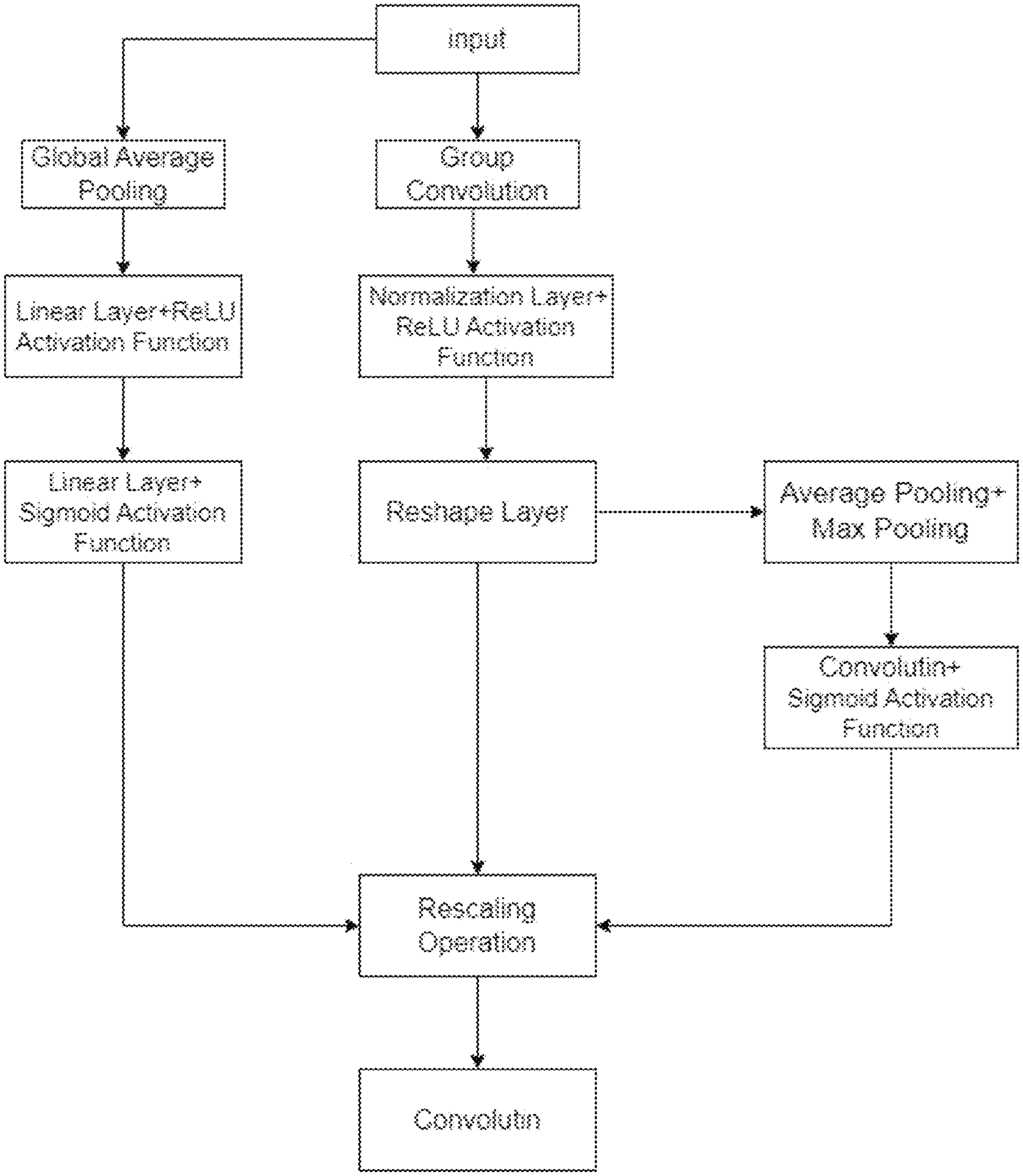

FIG. 4: Schematic diagram of the Receptive Field Attention Convolution module of the present invention.

Figure 5:
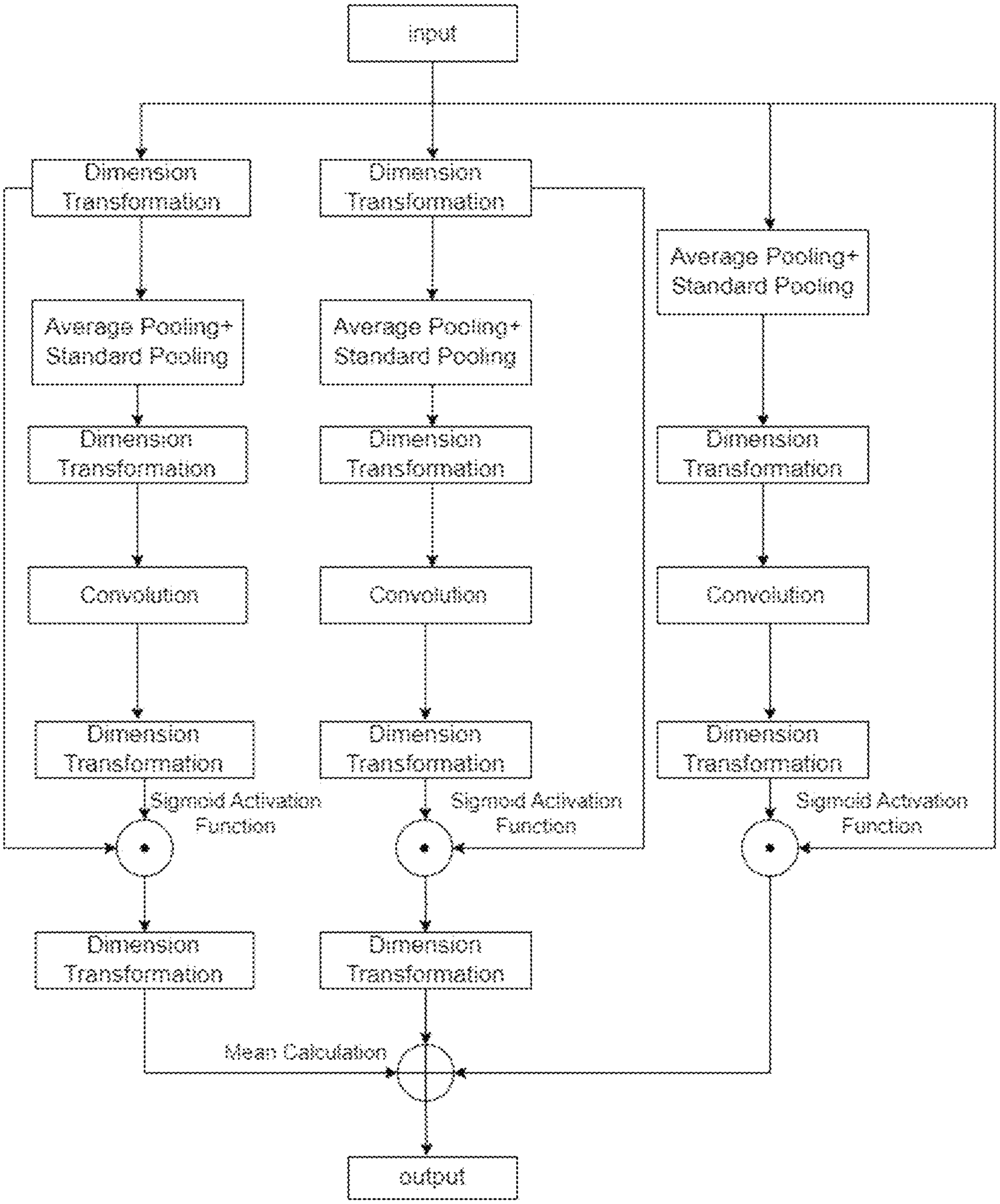

FIG. 5: Schematic diagram of the Multidimensional Collaborative Attention module of the present invention.

Figure 6:
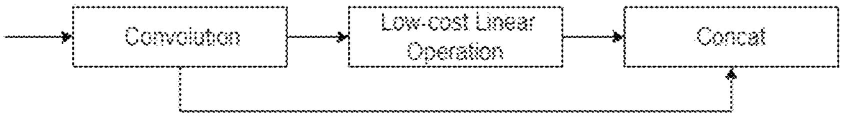

FIG. 6: Schematic diagram of the Lightweight Convolution composition of the present invention.

Figure 7:
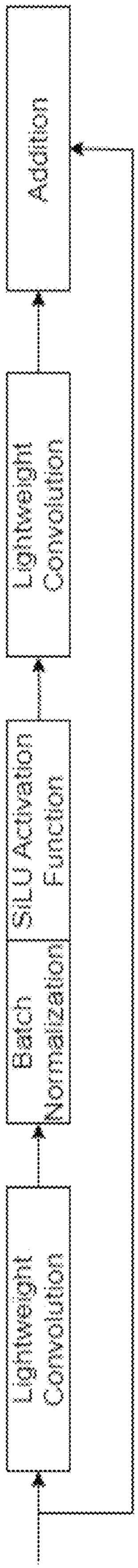

FIG. 7: Schematic diagram of the Lightweight Bottleneck Layer composition of the present invention.

Figure 8:
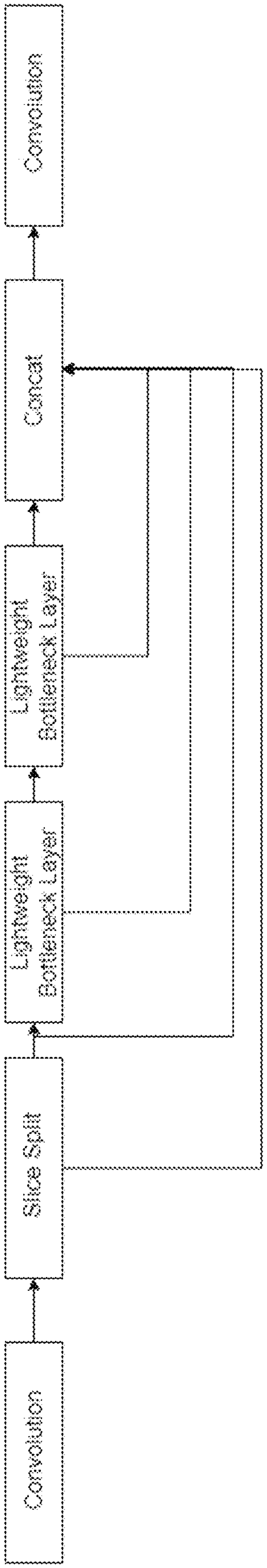

FIG. 8: Schematic diagram of the Lightweight Module of the present invention.

Figure 9:
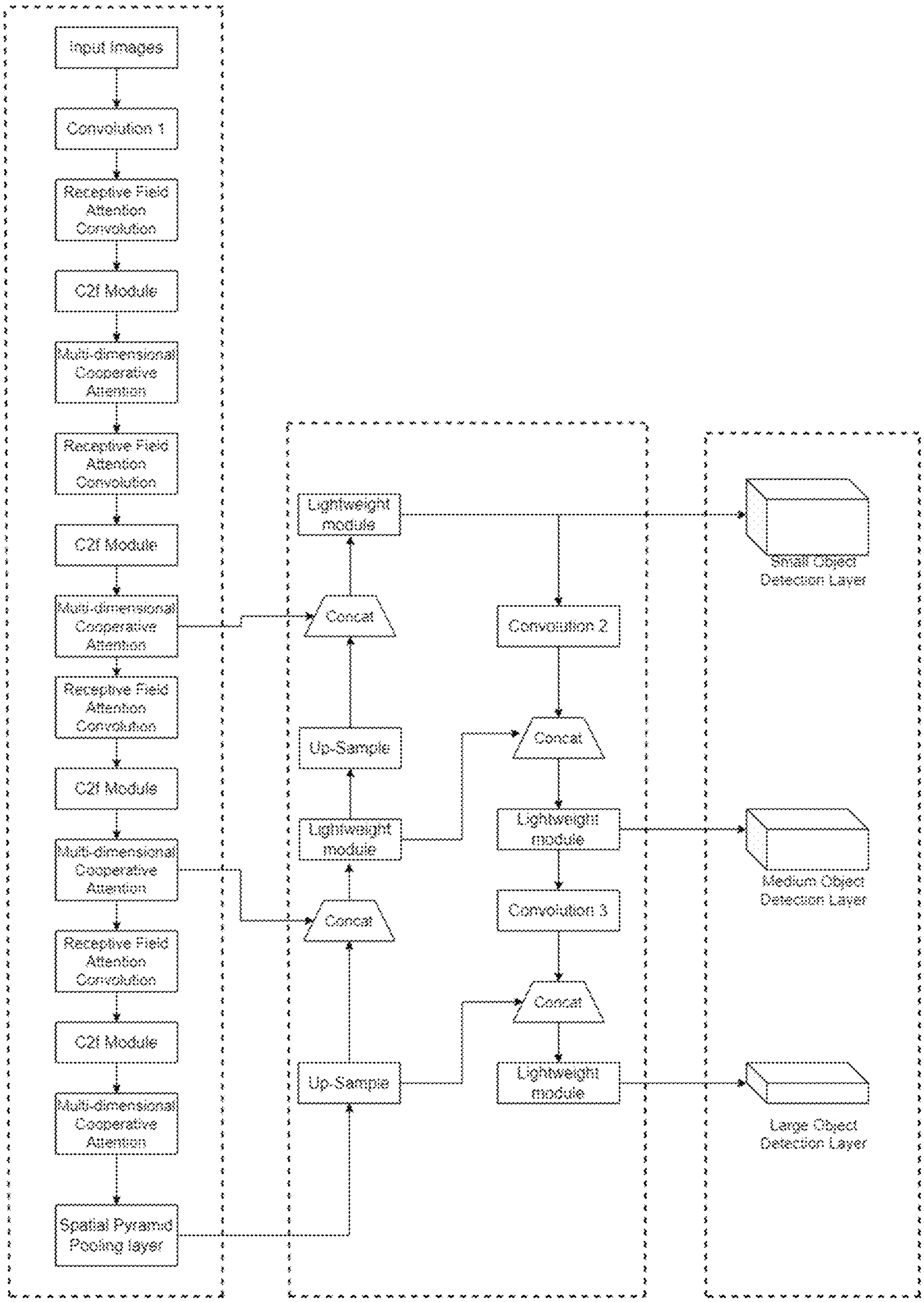

FIG. 9: Schematic diagram of the improved YOLOv8 object detection model structure of the present invention.

SPECIFIC IMPLEMENTATION

The following will describe the technical solution in the embodiment of the present invention with reference to the accompanying drawings, clearly and comprehensively. It is evident that the described embodiment is only a part of the embodiments of the present invention, not all of them. Based on the embodiments in the present invention, all other embodiments obtained by those skilled in the art without creative work belong to the scope protected by the present invention.

Please refer to FIGS. 1 to 10. In the embodiment of the present invention, a technical solution is provided: a method for intelligent sorting and detection of construction waste. The method steps are as follows:

S1. Collecting construction waste images at the construction waste sorting site as the original image sample set. Improve the SRGAN algorithm, using the improved SRGAN algorithm to preprocess the images in the construction waste dataset. Enhance the super-resolution of the image dataset samples, solve the problem of difficult detection and recognize caused by blurred features in some construction waste images in dusty environments. The preprocessed dataset is then labeled and divided into training, validation, and test sets in an 8:1:1 ratio.

Example 1: Four types of samples, including red bricks, stones, wood, and plastic, were selected as targets, with a total of 3336 construction waste dataset images collected as the original image sample set.

Using the improved SRGAN algorithm to preprocess the images in the construction waste dataset, enhance the super-resolution of the image dataset samples.

Subsequently, the preprocessed dataset samples were labeled using Labeling. The number of red brick labels are 3196, stone labels are 2451, wood labels are 2351, and plastic labels are 4424. These are compiled into a dataset in VOC format and divided into training, validation, and test sets in an 8:1:1 ratio.

The improved SRGAN algorithm mainly consists of two modules: a generator and a discriminator. As shown in FIG. 2, the discriminator has a total of 34 layers. The first layer is a convolutional layer, the second layer is a LeakyReLU activation function layer, the third to sixth layers consist of a convolutional layer, batch normalization layer, LeakyReLU activation function layer, and efficient multi-scale attention layer. Layers 7 to 28 repeat the modules of layers 3 to 6, the twenty-ninth layer is a dense connection layer, the thirtieth layer is a LeakyReLU activation function layer, the thirty-first layer is a dense connection layer, and the final layer is a Sigmoid activation function layer.

The EMA efficient multi-scale attention layer utilizes a group structure that does not require dimension reduction, allowing for spatial learning and the design of a multi-scale parallel sub-network to process image features, improving model detection performance and effectively reducing model parameters. The structure of the EMA efficient multi-scale attention is shown in FIG. 3.

S2. In order to address the issue of architectural waste image feature loss caused by the vibration of the conveyor belt and mutual obstruction of architectural waste, an improved YOLOv8 detection and recognition model is adopted. In the feature extraction part of the model's backbone, receptive field channel attention convolution (RFCBAM) and multidimensional collaborative attention module (MCA) are introduced. The structures of the receptive field channel attention convolution and multidimensional collaborative attention module are shown in FIGS. 4 and 5. A lightweight module is designed in the feature fusion part of neck, which consists of lightweight convolution and lightweight bottleneck layers as shown in FIGS. 6 and 7. The lightweight module is illustrated in FIG. 8. The YOLOv8 model is improved to construct an improved YOLOv8 object detection model, whose structure is shown in FIG. 9. By using the trained improved YOLOv8 object detection model for architectural waste intelligent sorting detection and recognition, the problem of architectural waste image feature loss caused by the vibration of the conveyor belt and mutual obstruction of architectural waste is effectively solved.

The backbone's feature extraction part consists of 15 layers. The first layer is the input image layer, the second layer is the convolutional layer, the third layer is the receptive field attention convolutional layer, the fourth layer is the C2f module, the fifth layer is the multi-dimensional collaborative attention module, the sixth layer is the receptive field attention convolutional layer, the seventh layer is the C2f module, the eighth layer is the multi-dimensional collaborative attention module with output feature P1, the ninth layer is the receptive field attention convolutional layer, the 10th layer is the C2f module, the eleventh layer is the multi-dimensional collaborative attention module with output feature P2, the twelfth layer is the receptive field attention convolutional layer, the thirteenth layer is the C2f module, the fourteenth layer is the multi-dimensional collaborative attention module, and the fifteenth layer is the spatial pyramid pooling layer with output feature P3.

To address the issue of architectural waste image feature loss caused by conveyor belt vibration, the receptive field attention convolution module consists of 3 branches. The first branch sends the input features to a global average pooling layer, then passes through a linear layer with ReLU activation function, and finally enters a linear layer followed by a Sigmoid activation function to output Feature1.

The second branch sends the input features to a group convolutional layer, then goes through a normalization layer with ReLU activation function, and finally enters a reshaping layer to output Feature2.

The third branch takes the output feature Feature2, applies average pooling and max pooling, then goes through convolution and Sigmoid activation function to output Feature3.

Finally, Feature1, Feature2, and Feature3 undergo reweighting and are sent to a convolutional layer.

To address the issue of architectural waste image feature loss caused by mutual occlusion of architectural waste on the conveyor belt, the multidimensional collaborative attention module consists of 3 branches. The first branch sends the input features to a dimension transformation layer to output feature C1, then passes through average pooling and standard deviation pooling layers, followed by another dimension transformation layer, convolutional layer, and dimension transformation layer. After applying a Sigmoid activation function, C2 is calculated. Then, C1 and C2 are multiplied to output feature C3, which is then sent to a dimension transformation layer to output feature C4.

The second branch sends the input features to a dimension transformation layer to output feature C5, then goes through average pooling and standard deviation pooling layers, followed by another dimension transformation layer, convolutional layer, and dimension transformation layer. After applying a Sigmoid activation function, C6 is calculated. Then, C5 and C6 are multiplied to output feature C7, which is then sent to a dimension transformation layer to output feature C8.

The third branch sends the input features to average pooling and standard deviation pooling layers, followed by a dimension transformation layer, convolutional layer, and dimension transformation layer. After applying a Sigmoid activation function, C9 is calculated. Then, the input features are multiplied by C9 to output feature C10.

Finally, the output features C4, C8, and C10 are averaged and then output.

The receptive field attention convolutional layer focuses on the spatial features of the receptive field, solving the problem of parameter sharing in convolutional kernels and providing effective attention weights for large-sized convolutional kernels. The multidimensional collaborative attention module is a form of synchronous reasoning attention that uses 3 branches in terms of channel, height, and width. It incurs almost no additional computational cost. The attention module internally designs a gating mechanism to adaptively determine the coverage range of image feature interactions, further enhancing the model's extraction of image features. After integrating the feature extraction parts of the receptive field attention convolutional layer and the multidimensional collaborative attention module into the backbone network, the model's extraction of image features is strengthened, addressing the issue of feature loss. It can effectively solve the problem of architectural waste image feature loss caused by the vibration of the conveyor belt and mutual occlusion of architectural waste, thereby improving the detection accuracy of the model.

In the neck feature fusion part, after up-sampled the output feature P3 is concatenated with the output feature P2 to form the output feature P4. The output feature P4 is then passed through a lightweight module to produce the output feature P5, which is up-sampled and concatenated with the output feature P1 to form the output feature P6. The output feature P6 is further processed by a lightweight module before entering the small target detection layer of the detection module. Simultaneously, the output feature P6 is concatenated with the output feature P5 after convolution to form the output feature P7. The output feature P7 is processed by a lightweight module before entering the medium target detection layer of the detection module. Similarly, the output feature P7 is concatenated with the output feature P3 after convolution to form the output feature P8. The output feature P8 is processed by a lightweight module before entering the large target detection layer of the detection module.

The improved YOLOv8 model for intelligent sorting and detection of construction waste incorporates Conv1, Conv2, and Conv3 in the main feature extraction part and neck feature fusion part, all consisting of ordinary convolutions (Conv2d), BN batch normalization layers, and SiLU activation functions.

In order to improve the detection and recognition speed of the model, a new lightweight module is designed to replace all bottleneck layers in the C2f module of the original YOLOv8 model with lightweight bottleneck layers. This structure utilizes cross-stage feature fusion strategies and gradient flow truncation techniques to enhance the variability of learning features between different network layers, thereby reducing the impact of redundant gradient information and strengthening the network's learning ability.

In the neck feature fusion part of the model, a lightweight module is designed, which consists of 4 branches. The first branch is composed of a convolution module, which is the same as Conv1, Conv2, and Conv3. The second branch consists of a convolution module and a slice segmentation module. The third branch consists of a convolution module, a slice segmentation module, and a lightweight bottleneck layer. The fourth branch consists of a convolution module, a slice segmentation module, and two identical lightweight bottleneck layers. These 4 branches are concatenated together and the output is processed by a convolution module.

After the fusion of the neck feature fusion part with the lightweight module, a large number of 3×3 ordinary convolutions in the original structure are reduced, greatly reducing the model size of the network, reducing the number of parameters and computational load, effectively improving the detection speed of the model, enabling the model to be deployed on mobile devices, making it easier to achieve intelligent sorting and recognition of construction waste;

In order to solve the problem of difficult detection and recognition caused by blurry image features of construction waste in dusty environments, the EMA efficient multi-scale attention module consists of three branches. The first branch divides the input features into feature groups, sends them to the X average pooling layer to output feature A1, the second branch divides the input features into feature groups, sends them to the Y average pooling layer to output feature A2. Features A1 and features A2 are concatenated and convolved to output feature A3, which then continue to enter the first and second branches for further processing. In the first branch, output feature A3 enters the Sigmoid function to output feature A4.

In the second branch, the output feature A3 enters the Sigmoid function to produce feature A5. Then, the feature group, output feature A4, and output feature A5 undergo a reweighting operation to produce feature A6. Feature A6 enters group normalization to produce feature A7. Subsequently, feature A7 is fed into an average pooling layer and then processed by a Softmax normalization function to produce feature A8.

The third branch divides the input features into feature groups, which are then sent to a convolution layer to produce output feature A9. Output feature A9 is split into two paths: one path is sent to the first branch to be combined with output feature A8 and processed by a Matnul function to produce feature A10, while the other path goes through an average pooling layer and a Softmax normalization function to produce feature A11. Feature A11 and output feature A7 are then input into a Matnul function to produce feature A12.

After combining output feature A12 with output feature A10, they enter a Sigmoid function to produce feature A13. Finally, feature A13 undergoes reweighting with the feature group before being presented as the final output.

In order to achieve accurate and effective bounding box regression, enhance the detection accuracy and generalization capability of the model, we optimized the loss function of the YOLOv8 original model. We adopted the Minimum Point Distance IoU (MPDIOU) loss function for bounding box similarity comparison, which includes all relevant factors considered in existing loss functions, including overlapping or non-overlapping regions, center point distance, width and height deviations. This metric simplifies the computation process while addressing the issue that most existing bounding box regression loss functions cannot optimize when the predicted box and the ground truth box have the same aspect ratio but completely different width and height values.

In order to further improve the detection recognition speed of the model, the optimizer in the original YOLOv8 model has been enhanced by adopting the Sophia optimizer. This optimizer is a lightweight second-order optimizer that uses a cheap random estimate of the Hessian diagonal as a preconditioner and controls the update size in worst-case scenarios through a clipping mechanism, significantly enhancing the computational speed of the model while reducing training costs.

S3. The construction waste dataset images are fed into the improved YOLOv8 construction waste intelligent detection recognition model for training and validation. Label smoothing is applied during the training process to obtain optimal weights.

After the dataset is processed using the improved SRGAN algorithm, a construction waste image database is constructed. The dataset is divided into training, validation, and test sets in an 8:1:1 ratio, which are respectively used for training, validation, and testing of the improved YOLOv8 construction waste intelligent detection recognition model.

During the training process, the number of training epochs is set as 300, and the batch size is set as 16.

S4. After obtaining the optimal weights, testing and loading the optimal weights, and then feeding the construction waste dataset images from the test set into the improved YOLOv8 construction waste intelligent detection model for testing.

The experiments are conducted on a Windows 10 operating system with an NVIDIA Geforce RTX 3060 Ti GPU, an Intel Core i5-10400F CPU @ 2.90 GHz, CUDA 11.6, cuDNN 8.4.1.50, and Python 3.9.

The improved YOLOv8 construction waste intelligent detection recognition model is evaluated using Frames Per Second (FPS), F1 Score, and mean Average Precision (mAP).

The experiment results show that the FPS achieved on the test set is 52. The F1 scores for red bricks, stones, wood, and plastic are 0.95, 0.94, 0.96, and 0.97 respectively, with an mAP value of 96.78%. This validates the effectiveness of the proposed method in this implementation, as it can effectively address the issue of construction waste image feature loss caused by conveyor belt vibration and mutual obstruction of construction waste, as well as the problem of some construction waste image features becoming blurred in dusty environments, making detection and recognition difficult. This demonstrates the accurate intelligent detection and recognition of construction waste.

This invention ensures high detection speed while improving accuracy, providing an effective method for intelligent detection and recognition of construction waste.

Computer vision deep learning object detection methods can be broadly categorized into two-stage detection and recognition algorithms represented by Fast R-CNN and Faster R-CNN, and single-stage algorithms represented by YOLO (You Only Look Once) and SSD (Single Shot Detector).

Two-stage detection algorithms first generate candidate boxes to determine regions containing objects, and then use complex architectures to detect and classify the candidate boxes, focusing more on the selective region proposal strategy of complex architectures.

Single-stage detection algorithms directly detect and classify all spatial regions, focusing on proposals for all spatial regions, and detecting targets in one go through relatively simple architectures. Single-stage detection algorithms can perform real-time object detection with high accuracy, featuring fast detection speed, easy algorithm implementation, and end-to-end optimization. Therefore, in intelligent sorting and detection of construction waste, single-stage detection algorithms are often given priority, as they can effectively address issues such as loss of construction waste image features due to conveyor belt vibrations and mutual obstruction of construction waste, as well as difficulties in detecting and recognizing construction waste images with blurred features in dusty environments.

The above illustrates and describes the basic principles, main features, and advantages of the present invention. For those skilled in the art, it is evident that the present invention is not limited to the details of the exemplary embodiments provided above, and can be implemented in other specific forms without departing from the spirit or essential characteristics of the invention. Therefore, regardless of the perspective, the embodiments should be considered exemplary and non-limiting. The scope of the invention is defined by the appended claims rather than the description above, aiming to encompass all variations falling within the meaning and scope of the equivalent elements of the claims. Any drawing reference in the claims should not be construed as limiting the scope of the claims involved.

Furthermore, it should be understood that although this specification describes embodiments, not every embodiment contains a single independent technical solution. This narrative in the specification is solely for clarity, and those skilled in the art should consider the specification as a whole. The technical solutions in various embodiments can also be appropriately combined to form other embodiments that can be understood by those skilled in the art.

The invention claimed is:

1. A method for intelligent sorting, detection and recognition of construction waste, comprising:

(S1) collecting construction waste images at a construction waste sorting site as an original image sample set to provide construction waste dataset images, improving Super-Resolution Generative Adversarial Network (SRGAN) algorithm, using the improved SRGAN algorithm to preprocess the construction waste dataset images, making labels for the preprocessed dataset, and dividing the preprocessed dataset into training, validation, and test sets in an 8:1:1 ratio;

(S2) using a You Only Look Once version 8 (YOLOv8) detection and recognition model, introducing receptive field attention convolution and multidimensional collaborative attention modules in a feature extraction part of a backbone of the model, designing a lightweight module in a feature fusion part, which consist of lightweight convolutions and bottleneck layers, improving the YOLOv8 model, building an improved YOLOv8 target detection model, and using the improved YOLOv8 target detection model for intelligent sorting, detection, and recognition of construction waste;

in the a neck feature fusion part, an output feature P3 is up-sampled and concatenated with an output feature P2 to form an output feature P4, which is then processed by the lightweight module to output feature P5; then P5 is up-sampled and concatenated with an output feature P1 to form an output feature P6, which is processed by the lightweight module to enter a small target detection layer of a detection module part; at the same time, the output feature P6 is convolved and concatenated with the output feature P5 to form an output feature P7, which is then processed by the lightweight module to enter a medium target detection layer of the detection module part; similarly, the output feature P7 is convolved and concatenated with the output feature P3 to form an output feature P8, which is then processed by the lightweight module to enter a large target detection layer of the detection module part;

(S3) putting the construction waste dataset images into the improved YOLOv8 construction waste intelligent detection and recognition model for training and validation, and use label smoothing during a training process to obtain optimal weights;

after processing the dataset with the improved SRGAN algorithm, a construction waste image database is constructed and divided into training, validation, and test sets in an 8:1:1 ratio, which are used for training, validation, and testing of the improved YOLOv8 construction waste intelligent detection and recognition model respectively; during the training process, the training was set to 300 epochs with a batch size of 16;

(S4) after obtaining the optimal weights, testing is performed by loading the optimal weights and feeding the construction waste dataset images of a test set into the improved YOLOv8 construction waste intelligent detection model for testing.

2. The method for intelligent sorting, detection, and recognition of construction waste according to claim 1, wherein the improved SRGAN algorithm mainly consists of two modules, a generator and a discriminator;

the discriminator has 34 layers in total, a first layer is a convolutional layer, a second layer is Leaky Rectified Linear Unit (LeakyReLU) activation function layer, a third to sixth layers are convolutional layers, batch normalization layer, LeakyReLU activation function layer, and Efficient Multi-scale Attention (EMA) efficient multi-scale attention layer respectively; a seventh to twenty-eighth layers repeat the modules of the third to sixth layers, a twenty-nineth layer is a dense connection layer, a thirtieth layer is a LeakyReLU activation function layer, a thirty-first layer is a dense connection layer, and a last layer is a Sigmoid activation function layer.

3. The method for intelligent sorting, detection, and recognition of construction waste according to claim 2, wherein the EMA efficient multi-scale attention layer uses a group structure that does not require dimension reduction, learns across spaces, and designs a multi-scale parallel subnetwork to process image features.

4. The method for intelligent sorting, detection, and recognition of construction waste according to claim 1, wherein the feature extraction part of the backbone has 15 layers in total: a first layer is an input image layer, a second layer is a convolutional layer, a third layer is a receptive field attention convolution layer, a fourth layer is C2f module (C2f), a fifth layer is a multidimensional collaborative attention module, a sixth layer is a receptive field attention convolution layer, a seventh layer is a C2f module, an eighth layer is a multidimensional collaborative attention module, the output feature of the eighth layer is P1, a ninth layer is a receptive field attention convolution layer, a tenth layer is a C2f module, an eleventh layer is a multidimensional collaborative attention module, the output feature of the eleventh layer is P2, a twelfth layer is a receptive field attention convolution layer, a thirteenth layer is a C2f module, a fourteenth layer is a multidimensional collaborative attention module, a fifteenth layer is a spatial pyramid pooling layer, and the output feature of the fifteenth layer is P3.

5. The method for intelligent sorting, detection, and recognition of construction waste according to claim 1, wherein the receptive field attention convolution module consists of three branches, a first branch sends the input feature to a global average pooling layer, then into a linear layer with Rectified Linear Unit (ReLU) activation function, and finally into a linear layer and Sigmoid activation function to output feature Feature1;

the a second branch sends the input feature to a group convolutional layer, then into a normalization layer and ReLU activation function, finally entering a reshaping layer to output feature Feature2;

a third branch takes the output feature Feature2 into average pooling and max pooling layers, then into convolution and Sigmoid activation function to output feature Feature3;

finally, Feature1, Feature2, and Feature3 undergo reweighting and are put into the convolutional layer.

6. The method for intelligent sorting, detection, and recognition of construction waste according to claim 1, wherein the multidimensional collaborative attention module consists of 3 branches, a first branch sends the input feature to a dimension transformation layer to output feature Convolution 1 (C1), then into average pooling and standard deviation pooling layers, then into dimension transformation, convolution, dimension transformation layers, and then calculates Convolution 2 (C2) using the Sigmoid activation function; C1 is multiplied with C2 to output feature Convolution 3 (C3), finally sent to a dimension transformation layer to output feature Convolution 4 (C4);

the a second branch sends the input feature to a dimension transformation layer to output feature Convolution 5 (C5), then into average pooling and standard deviation pooling layers, then into dimension transformation, convolution, dimension transformation layers, and then calculates C6 using the Sigmoid activation function, C5 is multiplied with Convolution 6 (C6) to output feature Convolution 7 (C7), finally sent to the a dimension transformation layer to output feature Convolution 8 (C8);

a third branch sends the input feature into average pooling and standard deviation pooling layers, then into dimension transformation, convolution, dimension transformation layers, and then calculates C9 using the Sigmoid activation function, the input feature is multiplied with C9 to output feature Convolution 10 (C10);

finally, the average of output features C4, C8, and C10 are output.

7. The method for intelligent sorting, detection, and recognition of construction waste according to claim 1, wherein in the improved YOLOv8 construction waste intelligent sorting, detection, and recognition model, Convolution 1 (C1), Convolution 2 (C2), and Convolution 3 (C3) in the feature extraction part of the backbone and the feature fusion part are composed of ordinary convolution, batch normalization layer, and Sigmoid Weighted Linear Unit (SiLU) activation function.

8. The method for intelligent sorting, detection, and recognition of construction waste according to claim 1, wherein a lightweight module is designed in the feature fusion part of the model's neck, the lightweight module consists of 4 branches, a first branch consists of a convolution module, which is the same as C1, C2, and C3, a second branch consists of a convolution module and a slice segmentation module, a third branch consists of a convolution module, a slice segmentation module, and a lightweight bottleneck layer, a 4th branch consists of a convolution module, a slice segmentation module, and two identical lightweight bottleneck layers, the 4 branches are concatenated, and finally processed by a convolution module for output.

9. The method for intelligent sorting, detection, and recognition of construction waste according to claim 1, wherein the EMA efficient multi-scale attention module consists of 3 branches, a first branch divides the input features into feature groups, sends them to an X average pooling layer to output feature A1; a second branch divides the input features into feature groups, sends them to a Y average pooling layer to output feature A2, the output features A1 and A2 are concatenated and convolved to output feature A3, which then enters the first branch and second branch for further processing, In the first branch, the output feature A3 enters the Sigmoid function to output feature A4;

in the second branch, the output feature A3 enters the Sigmoid function to output feature A5, then the feature groups, output feature A4, and output feature A5 undergo reweighting to output feature A6, which enters group normalization to output feature A7, then feature A7 is sent to average pooling layer and processed by the Softmax normalization function to output feature A8;

the a third branch divides the input features into feature groups, sends them to the convolution to output feature A9; A9 is split into two paths, one is combined with output feature A8 and enters the Matnul function to output feature A10 in the first branch, the another goes through average pooling layer and Softmax normalization function to output feature A11; A11 and output feature A7 are sent to the Matnul function to output feature A12;

after combining output feature A12 with output feature A10 and entering the Sigmoid function, output feature A13 is obtained, finally, output feature A13 undergoes reweighting with the feature groups for the final output.

10. The method for intelligent sorting, detection, and recognition of construction waste according to claim 1, wherein optimizing the loss function of the original YOLOv8 model, using Minimum Point Distance Intersection over Union (MPDIoU) loss function, and the optimizer used in the original YOLOv8 model is the Sophia optimizer.

* * * * *